Patented Sept. 13, 1932

1,877,305

UNITED STATES PATENT OFFICE

ERNEST F. GRETHER, OF MIDLAND, MICHIGAN, ASSIGNOR TO THE DOW CHEMICAL COMPANY, OF MIDLAND, MICHIGAN, A CORPORATION OF MICHIGAN

METHOD OF MAKING SALICYLIC ESTER CARBONATES

No Drawing. Application filed October 26, 1931. Serial No. 571,290.

This application relates to improved procedure for preparing carbonates of salicylic acid esters.

In my prior application Serial No. 370,728, filed June 13, 1929, I have disclosed an improved method wherein a salicylic acid ester, an alkali and phosgene are reacted in a medium consisting chiefly of acetone. The reaction proceeds in accordance with the equation:—

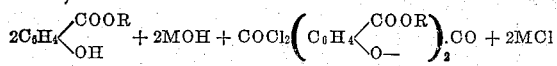

wherein R is an alkyl or aryl radicle and M an alkali metal. The employment in the reaction of a non-hydrolyzing vehicle or medium such as acetone, in which the several reaction components are all soluble, is there shown to result in greatly improved yields of desired product. In fact, substantially quantitative yields are obtained thereby.

I have now found, in the further development of the method, that methyl ethyl ketone may be substituted wholly or in part for acetone as the vehicle for the aforesaid reaction with substantially as good results. The invention, then, consists in the modified and improved procedure hereinafter fully described and particularly pointed out in the claims.

As an illustrative example, 99 grams (1 mol.) of ethyl salicylate was dissolved in 240 cubic centimeters (192 grams) of methyl ethyl ketone, and 33 grams (1 mol.) of potassium hydroxide in 50 per cent aqueous solution was slowly added with stirring and cooling, if necessary, to maintain the mixture at or not greatly above room temperature, while 29.7 grams (½ mol.) of phosgene was introduced into the mixture. After the reaction was complete the product was treated with 200 cubic centimeters of ice water. The mixture separated into an upper oily layer and a lower aqueous layer. The oily layer was removed and distilled to separate methyl ethyl ketone. The residue was then recrystallized from ethyl alcohol, producing clean, colorless crystals of ethyl salicylate carbonate; M. P. 95°–96° C. The purified product was obtained in 85 per cent yield.

Similarly, the carbonates of other alkyl or aryl esters of salicylic acid may be prepared, e. g. the methyl, propyl, butyl or phenyl salicylate carbonates. If desired, a mixture of acetone and methyl ethyl ketone may be employed as vehicle for the reaction, instead of a single ketone. The ketone may be recovered by distillation from the reaction product and reused in the process.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. The method of making the carbonate of a salicylic acid ester which comprises reacting the corresponding ester with phosgene and an alkali metal hydroxide in a medium comprising methyl ethyl ketone.

2. The method of making an alkyl salicylate carbonate which comprises reacting an akyl salicylate with phosgene and an alkali metal hydroxide in a medium of methyl ethyl ketone.

3. The method of making ethyl salicylate carbonate which comprises reacting ethyl salicylate with an approximately equivalent proportion of phosgene and an alkali metal hydroxide in a medium of methyl ethyl ketone.

4. In a method of making a salicylic acid ester carbonate, the steps which consist in dissolving the corresponding salicylic acid ester in methyl ethyl ketone and slowly adding a concentrated aqueous solution of an alkali metal hydroxide while introducing phosgene into the mixture.

Signed by me this 20 day of October, 1931.

ERNEST F. GRETHER.